Nov. 10, 1936.   E. L. MAYO   2,060,332

THERMOSTATICALLY CONTROLLED VALVE

Filed June 20, 1934

INVENTOR.
Edward L. Mayo.
BY
Slaugh and Canfield
ATTORNEY.

Patented Nov. 10, 1936

2,060,332

UNITED STATES PATENT OFFICE 2,060,332

THERMOSTATICALLY CONTROLLED VALVE

Edward Levy Mayo, Cleveland, Ohio, assignor to The Bishop & Babcock Mfg. Company, Cleveland, Ohio, a corporation of Ohio Application June 20, 1934, Serial No. 731,491

12 Claims. (Cl. 236—34)

This invention relates to thermostatically controlled valves and particularly to thermostatically controlled valves for varying the flow rate of fluids in accordance with changes of temperature thereof.

It is an object of the present invention to provide generally an improved thermostatically controlled valve construction.

Another object is to provide, in a thermostatically controlled valve construction, improved mechanism means for applying thermally effected movements of a thermostatic element to valve operating purposes.

Another object is to provide improved means for adjusting a thermostatically controlled valve to predetermine flow rates at predetermined temperatures.

Another object is to provide a thermostatically controlled valve construction operable in an improved manner by a thermostatic element of the bimetal type.

Another object is to provide, in a thermostatically controlled valve construction, improved means for magnifying small thermally effected movements for valve operating purposes.

Other objects will be apparent to those skilled in the art to which my invention appertains.

My invention is fully disclosed in the following description taken in connection with the accompanying drawing, in which:—

Figure 1:
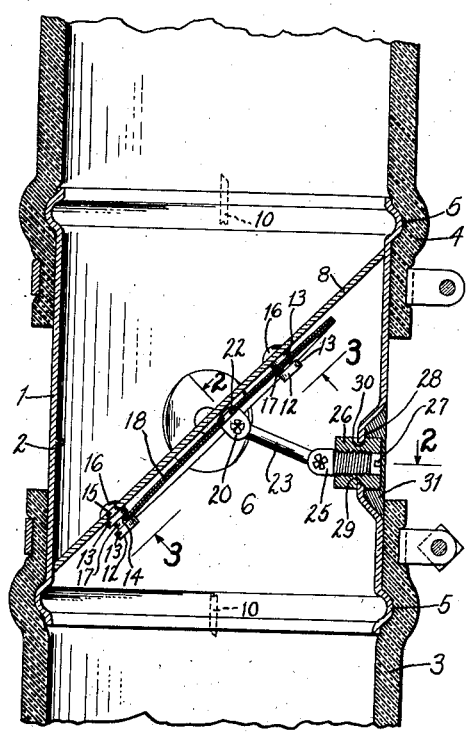
Fig. 1 is a longitudinal sectional view of an embodiment of my invention.
Figure 4:
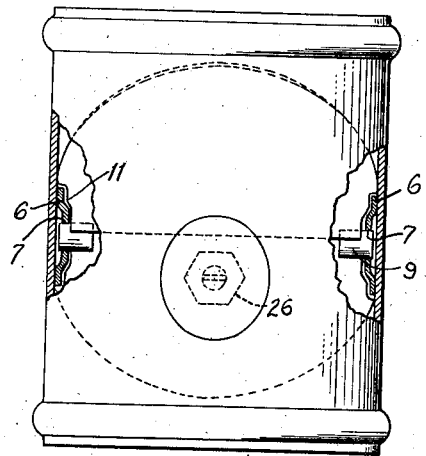
Fig. 4 is an elevational view taken from the right-hand side of the embodiment of Fig. 1 with parts broken away for clearness; and, Fig. 5 is a view illustrating a modification of the embodiment of my invention.

Referring to the drawing, I have shown at 1 a main supporting frame which, in the preferred embodiment illustrated, is tubular, providing a flow passageway or opening 2 therethrough. This embodiment is contemplated to be employed to control flow of liquids or gases in a conduit line, and a flexible conduit line such as a hose line is illustrated. Interrupted portions 3 and 4 of the hose line are accordingly telescoped over opposite end portions of the tubular frame 1 and the frame therefore may be provided with outwardly projecting annular bead portions 5—5 to facilitate sealing the hose portions 3 and 4 thereon.

Upon opposite inner wall portions of the tubular frame 1 and intermediate the ends of the passageway 2, are secured dished bearing pieces 6—6 of sheet metal having perforations 7—7 therein, substantially axially aligned.

A valve element 8, preferably formed from flat sheet metal, has trunnion elements 9—9 at oppositely spaced portions thereof. The trunnion elements are preferably formed from round bar stock slitted at one end and embracing opposite edge portions of the valve element 8 and projecting oppositely therefrom in axial alignment. The trunnion elements 9 are projected into the perforations 7—7 of the bearings 6, and thus is provided an oscillatory bearing support for the valve element 8.

The valve element 8 in the embodiment illustrated is disposed in an inclined position in the passageway 2 to close the same and thus its periphery is preferably elliptical when the passageway 2 is cylindrical. In a manner to be described, the valve element is adapted to be oscillated on the trunnion elements 9—9 toward or to the dotted line position 10 to control the rate at which fluid may flow through the passageway 2 in a well known manner. The valve element 8 at portions adjacent the trunnion elements 9 may be cut away as at 11—11 to clear adjacent portions of the bearing pieces 6—6.

In some cases it may be desired that the valve element 8, while being primarily positioned to close the passageway 2 by thermostatic means to be described, may nevertheless yield, at least slightly, to permit flow through the passageway 2 upon the occurrence of fluid pressure above a predetermined maximum; and in such cases, the axis of the trunnion elements 9—9 is disposed at one side, to the left as viewed in Fig. 1, of the longitudinal axis of the passageway, thus exposing a greater area to said pressure on one side of the axis than on the other.

Figure 3:
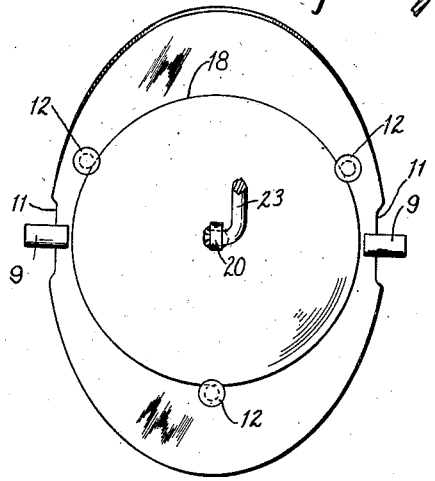
Fig. 3 is a fragmentary sectional view taken from the plane 3—3 of Fig. 1.

A plurality, such as three, supports 12—12 are secured to the valve element 8 preferably at the points of a triangle with the apex below, the supports in the preferred form comprising spaced flanges 13—13, an intermediate neck 14 and a stem 15 projected through a suitable perforation in the valve element 8 and riveted thereover as at 16. A groove 17 is thus provided on each support between the flanges 13—13 thereof. A preferably circular disc 18 of thermostatic bimetal is mounted with the peripheral edge thereof projecting into the grooves 17—17 as shown in Figs. 1 and 3, and the disc is thus supported on the valve element 8 spaced therefrom as shown at 19, Fig. 1. The bimetal of the disc is disposed with the material of the lesser coefficient of expansion adjacent the valve element 8. Preferably, the disc is dished by having an annular peripheral portion bent slightly out of the plane of the disc proper and the disc is supported on the supports 12—12, preferably with the convex side thereof toward the valve element 8.

Figure 2:
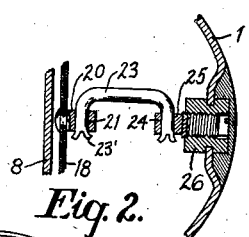
Fig. 2 is a fragmentary sectional view taken generally from the plane 2—2 of Fig. 1.

A bearing element 20 having a transverse perforation 21 therein generally parallel to the axis of the trunnion elements 9—9 is secured to a central portion of the bimetal disc 18 by a shank 22 thereof projected through a perforation in the disc and riveted over as shown in Figs. 1 and 2. A U-shaped link 23 has one of the U legs projected through the perforation 21 and expanded or riveted over as at 23' to prevent its withdrawal from the perforation. The opposite leg of the U is projected through a perforation 24 in an adjusting stud 25 threaded into a nut 26 having a screwdriver slot 27 therein for turning the same.

The wall of the tube 1 is offset inwardly as at 28, Fig. 1, providing a recess the bottom of which is perforated as at 29 and the nut 26 is provided with a groove 30 engaging the periphery of the perforation 29 whereby the nut may be rotated but anchored against longitudinal movement.

From the foregoing description it will now be apparent that upon a rise of temperature of fluid in the conduit system communicated to the bimetal disc 18, the latter will warp, central portions thereof moving farther away from the adjacent parts of the valve element 8, exerting thrust upon the U-shaped link 23, which thrust, by its reaction upon the threaded stud 25 in the bearing element 20 will effect rotational effort on the valve element 8 and move it pivotally around the trunnion elements 9—9 in the counter-clockwise direction as viewed in Fig. 1. The bearing element 20 and stud 25 are so disposed relatively to the trunnion elements 9—9 that this thrust will be in a line laterally of the axis of the trunnion elements 9—9 for the purposes mentioned.

Thus, upon a rise of temperature of fluid, the valve element 8 will be pivotally rocked to or toward the maximum flow position indicated in dotted lines at 10, the valve element 8 taking up a position in which it obstructs more or less the passageway 2 proportional to temperature of the fluid. On the fall of temperature of fluid, the bimetal disc 18 will return toward its normal position and correspondingly draw the valve element 8 to or toward its closed position illustrated.

The valve element 8 may be adjusted to take up any desired position at a given temperature by turning the nut 26 by the screwdriver slot 27 which will propel the stud 25 inwardly or outwardly, and correspondingly move the valve element to the desired position at that temperature. Preferably this adjustment is made when originally assembling the parts and thereafter the perforation 29 and the threads of the nut 26 may be sealed and the nut may be fixed against further rotation by solder or like material 31 applied to fill the offset recess 28 covering the nut and the screwdriver slot 27 to prevent unauthorized tampering therewith.

If desired, the bimetal disc 18 may be mounted in the supports 12—12 with the material thereof of greater coefficient of expansion on the side adjacent the valve element 8, in which case the valve element 8 will be rocked clockwise upon a rise of temperature.

Figure 5:
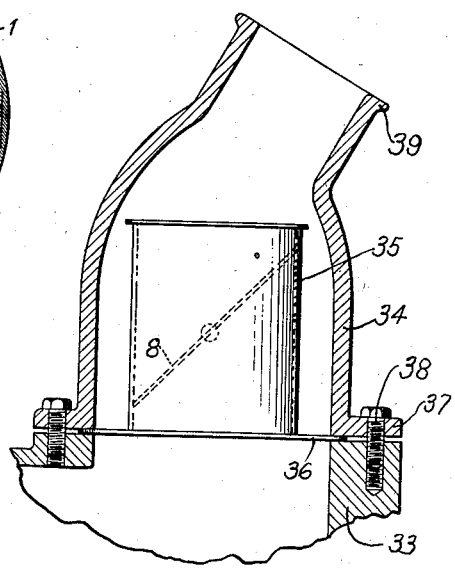

In the embodiment illustrated in Fig. 5, it is contemplated that the valve structure shall be of the immersion type mounted in a conduit system. Such a conduit system may comprise a conduit portion 33 in the form of a container or reservoir or other large capacity portion of the system, and a conduit portion 34 communicating therewith. The tubular valve frame 35 which may contain operative parts such as those described in connection with the other figures is in this case provided on the lower portion thereof with a flange 36 adapted to be sealingly clamped between the conduit portion 33 and a flange 37 on the conduit portion 34, for example by screws 38. Fluid in this system will flow through the tubular housing 35 and the rate thereof controlled by movements of a valve element 8 in the tubular frame 35.

Upper portions of the conduit portion 34 may be suitably formed to be joined to continuing portions of the conduit system, the form shown being provided with a bead 39 suitable to sealingly engage a hose conduit.

My invention is not limited to the exact details of construction shown and described and may be embodied in structures differing from the illustrated and described embodiment without departing from the spirit of my invention and without sacrificing its advantages and within the scope of the appended claims.

I claim:

1. In a thermostatically controlled valve construction, a tube providing a fluid passage, a valve element supported on the tube movable to control flow through the passage, a bimetal thermostatic element supported by spaced portions thereof upon the valve element and having an intermediate portion movable relative to the valve element responsive to temperature changes of the fluid and adapted to react upon the tube to correspondingly move the valve element.

2. In a thermostatically controlled valve construction, a tube providing a fluid passage, a valve element supported on the tube movable to control fluid flow through the passage, a disc-form bimetal thermostatic element supported by peripheral portions thereof upon the valve element and having an inner portion movable relative to the valve element responsive to changes of fluid temperature and adapted to react upon the tube to correspondingly move the valve element.

3. In a thermally responsive valve device, a tube providing a fluid passage, a valve element pivotally supported on the tube for controlling fluid flow through the passage, a bimetal thermostatic element supported by spaced portions thereof on the valve element and having an intermediate portion movable relative to the valve element responsive to changes of temperature of the fluid, and said intermediate portion being pivotally connected to the tube to react thereon to correspondingly move the valve element.

4. In a thermally responsive valve device, a tube providing a fluid passage, a valve element pivotally supported on the tube for controlling fluid flow through the passage, a bimetal thermostatic element supported by spaced portions thereof on the valve element and having an intermediate portion movable relative to the valve element responsive to changes of temperature of the fluid, said intermediate portion being pivotally connected to the tube to react thereon to correspondingly move the valve element, and means to adjustably move the said tube pivot connection to adjustably predetermine the valve element position at a predetermined fluid temperature.

5. In a thermally responsive valve construction, a tube providing a fluid passage, a valve element pivotally supported on the tube for controlling fluid flow through the passage, a disc-form thermostatic element supported by spaced peripheral portions thereof on the valve element and having an inner portion movable relative to the valve element responsive to changes of temperature of the fluid, and said inner portion being pivotally connected to the tube to react thereon to correspondingly move the valve element.

6. In a thermally responsive valve construction, a tube providing a fluid passage, a valve element pivotally supported on the tube for controlling fluid flow through the passage, a disc-form thermostatic element supported by spaced peripheral portions thereof on the valve element and having an inner portion movable relative to the valve element responsive to changes of temperature of the fluid, said inner portion being pivotally connected to the tube to react thereon to correspondingly move the valve element, and means to adjustably move the tube pivot connection to adjustably predetermine the valve element position at a predetermined fluid temperature.

7. In a thermally responsive valve device, a tube providing a fluid passage, a valve element pivotally supported on the tube for controlling fluid flow through the passage, a bimetal disc-form thermostatic element supported by spaced peripheral portions thereof on the valve element and having an inner portion movable relative to the valve element responsive to changes of temperature of the fluid, a link element pivotally connected to said inner portion and the tube to effect movement of the valve element corresponding to thermally effected movements of said inner portion.

8. In a thermostatically controlled valve construction, a frame providing a fluid passageway therethrough, a valve element supported on the frame movable to control flow through the passageway, a bimetal thermostatic element supported wholly by spaced portions thereof upon the valve element and movable bodily therewith and having an intermediate portion movable relative to the valve element responsive to temperature changes of the fluid and means through which said portion reacts upon the frame to correspondingly move the valve element.

9. In a thermostatically controlled valve construction, a frame providing a fluid passage, a valve element supported on the frame movable to control fluid flow through the passage, a disc-form bimetal thermostatic element supported solely by peripheral portions thereof upon the valve element and having an inner portion movable relative to the valve element responsive to changes of fluid temperature and means through which said inner portion reacts upon the frame to correspondingly move the valve element.

10. In a thermostatically controlled valve construction, a frame provided with a fluid passage, a valve pivoted to oscillate on an axis to control by its periphery flow through the passage, a thermostat carried wholly by the valve and movable bodily therewith and having a portion movable in a direction toward and from the plane of the valve periphery and tangential to the oscillation axis of the valve responsive to temperature changes of fluid in the passageway, and means causing said movable portion to react upon the frame to effect corresponding movement of the valve.

11. In a thermostatically controlled valve construction, a frame provided with a fluid passage therethrough, a valve pivoted to oscillate on an axis to control by its periphery flow through the passage, a thermostat carried wholly by the valve and movable bodily therewith and having a portion movable in a direction toward and from the plane of the valve periphery responsive to temperature changes of fluid in the passage, and means causing said movable portion to react upon the frame along a line tangential to the valve oscillation axis to effect corresponding movement of the valve.

12. In a thermostatically controlled valve construction, a frame providing a fluid passageway therethrough, a valve element supported on the frame movable to control flow through the passageway, a thermostatic element supported wholly by spaced portions thereof upon the valve element, movable bodily therewith and having an intermediate portion movable relative to the valve element responsive to temperature changes of the fluid, and means through which said intermediate movable portion reacts upon the frame to correspondingly move the valve element.

EDWARD LEVY MAYO.